July 12, 1960  F. T. GEYLING  2,945,082
HIGH PRESSURE INSULATING SEAL FOR ELECTRICAL CABLE SYSTEM
Filed July 5, 1957  3 Sheets-Sheet 1

INVENTOR
F. T. GEYLING
BY
John C. Morris
ATTORNEY

July 12, 1960

F. T. GEYLING 2,945,082

HIGH PRESSURE INSULATING SEAL FOR ELECTRICAL CABLE SYSTEM

Filed July 5, 1957

INVENTOR
F. T. GEYLING
BY
John C Morris
ATTORNEY

July 12, 1960    F. T. GEYLING    2,945,082
HIGH PRESSURE INSULATING SEAL FOR ELECTRICAL CABLE SYSTEM
Filed July 5, 1957    3 Sheets-Sheet 3

INVENTOR
F. T. GEYLING
BY John C. Morris
ATTORNEY

United States Patent Office 2,945,082
Patented July 12, 1960

2,945,082

HIGH PRESSURE INSULATING SEAL FOR ELECTRICAL CABLE SYSTEM

Franz T. Geyling, Summit, N.J., assignor to Bell Telephone Laboratories, Incorporated, New York, N.Y., a corporation of New York Filed July 5, 1957, Ser. No. 670,051

9 Claims. (Cl. 174—50.61)

This invention relates to seals for withstanding high pressures such as are encountered by deep sea submarine cables and accompanying housings for repeaters, equalizers, or other instrumentalities. More particularly, the invention relates to rigid seals comprising a metallic conductor, or conductors, and a vitreous insulating body of material such as glass or a ceramic.

One of the problems encountered in the manufacture of repeatered cables suitable for operation in deep water is that of sealing the repeater housing at its zone of juncture with the cable. The seals employed must be imprevious to water, even in its vapor state. One way of accomplishing a satisfactory result is by means of an inner or rigid seal that is vapor proof and outer or soft seals to protect the inner seal. This invention, as previously indicated, deals with the inner or rigid seal.

It has been found, as disclosed in Patent 2,676,197, to W. T. Read, Jr., et al., issued April 20, 1954, that a rigid seal, comprising an insulator body of vitreous material such as glass, securely bonded to a metallic member comprising a suitable alloy that can be bonded to the glass, will serve the indicated purpose.

It is an object of this invention to improve rigid seals of the kind noted.

A more specific object is to design a seal that will, under the high pressures encountered deep in the sea, be subjected to these pressures in a manner to insure suitably distributed strains in the vitreous portion of the seal. In other words, the strains should be what might be called "hydrostatic," i.e., like those in water under compression. The reason for structures in which such strains obtain is that glass and similar vitreous materials show their highest strength under such conditions.

In order to accomplish the noted objects, the seals in accordance with this invention have been designed to present convex interfaces to the external pressures transmitted through the insulator.

One embodiment of the invention, featuring the noted curved surface configuration and called a disc seal, includes essentially a toroidal body of vitreous material sealed between disc like metallic members. In the interest of simplicity of presentation, rather than in the nature of limitation, the vitreous material will in general be referred to herein as "glass." In the noted embodiment, the glass body has a cylindrical lateral surface and dished or concave ends with a cylindrical central aperture symmetrical with its axis. This glass body is located between, and bonded to, two convex metal discs of like diameter and having cylindrical bosses projecting into the central aperture. This metal-glass assembly is secured in a metal cup of somewhat greater diameter than the noted assembly by sealing one of the discs, which may be called the bottom disc, to the bottom of the cup. Advantageously, this bottom disc may have a hollow cylindrical portion projecting through a central opening in the bottom of the cup. Suitably insulated conductors coaxial with the assembly may be secured to opposite sides of the other or top disc. These conductors and the top disc constitute the inner conductor, and the cup along with the bottom disc constitute the outer conductor of a coaxial line section. With such a configuration, the glass is subjected to radial pressure transmitted from its cylindrical outside surface to the internal bosses and to axial pressure between the two discs; a condition of hydrostatic stress is approximated in the glass by this arrangement.

Another embodiment of this invention including the previously noted curved surface configuration and, in addition, counterpressure means, comprises a hollow central conductor having the shape of a body of revolution with a broad circular pedestal mounted on a glass base, and a constricted intermediate portion enclosed in and bonded to a conforming insulator of glass or other suitable vitreous material. This embodiment also includes a metallic cup having a hollow toroidal section surrounding and bonded to the glass insulator. In this device the hollow central conductor is as noted and with the metal cup as the outer conductor comprises a coaxial line section. The hollow metallic members of this seal serve as means for applying equalizing pressures to the glass. Because of the constricted shape, this modification has been called an "hour-glass" seal.

A feature of this invention resides in a coaxial, glass-to-metal seal wherein the body of glass or like vitreous material presents curved surfaces to the transmitted pressure to equalize internal strains in the glass, and to make these strains approximate an isotropic state.

A feature of the disc seal of this invention lies in a structure comprising two disc like members of metal having convex surfaces mating with and bonded to corresponding concave surfaces of a toroidal glass member.

A feature of the hour-glass seal of this invention resides in a hollow metal inner conductor having a longitudinally curved lateral surface mating with and bonded to a surrounding glass insulator having a complementally curved inner surface; the interior of the metal cylinder having access to external pressure.

An additional feature of the hour-glass seal comprises a hollow toroidal metal member having a longitudinally curved inner surface sealed to a complementally curved outer surface of the glass insulator. The annular hollow space in the toroidal member is vented to allow an external pressure transmitting medium to enter and apply pressure to the lateral surface of the glass insulator.

Other and further objects and features of this invention will appear more fully and clearly from the following description of illustrative embodiments thereof taken in connection with the above-mentioned drawing in which.

Figure 1:
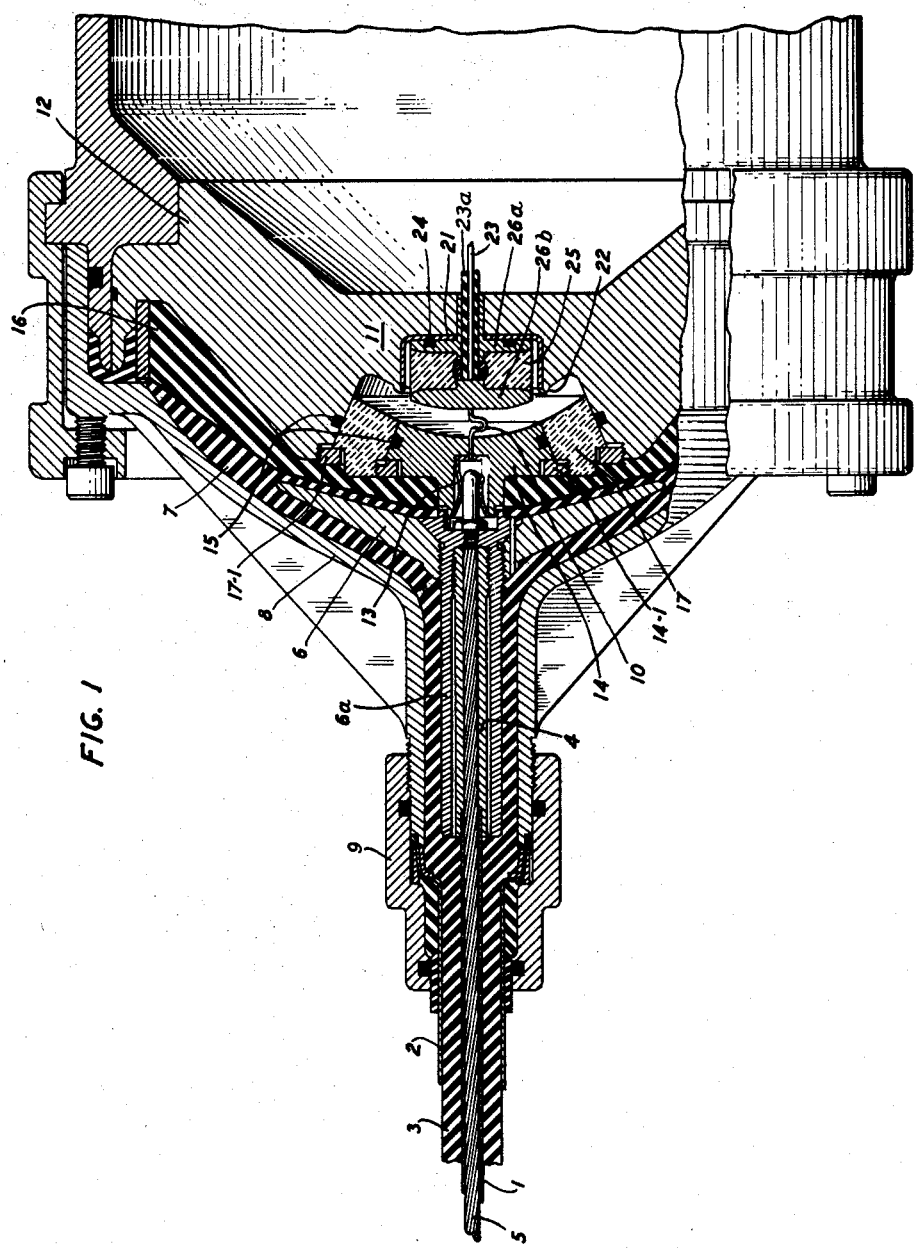
Fig. 1 is a partially sectioned view of a rigid instrument housing, a cable and the means for connecting them together including a seal in accordance with this invention.

Referring to Fig. 1, the deep sea cable comprises an inner metallic conductor 1 and an outer metallic conductor 2, e.g., of copper, separated and insulated from each other by a jacket 3 of insulation such as polyethylene. A twisted steel stranded wire core 5 is contained in the inner conductor 1 to provide strength.

The connection from the cable to the repeater comprises a metallic sleeve 4 swaged onto the core 5 of the cable. The end of the sleeve 4 is threaded into the stem 6A of a mushroom shaped anchor 6. The anchor 6 is encased in insulation, and, thus, transmits the cable tension to the repeater housing without making electrical contact with the housing. The anchor 6 is molded into a sheath or body 7 of insulation, which is contained in the funnel shaped metal shell 8 of the repeater cover and extends to and is merged with the cable insulation 3. Advantageously, the insulation 7 is the same as that of the cable, e.g., polyethylene. A collar or gland 9 screws onto the stem portion of the shell 8 to insure the anchoring of the outer conductor 2 and the insulating jacket 3 of the cable to the repeater housing. A more detailed disclosure of a rigid repeater cable assembly of this type is contained in the United States application of F. R. Dickinson, Serial No. 615,393, filed October 11, 1956, now Patent 2,877,283 issued January 27, 1959.

A plug connection from the anchor 6 leads to a connector 10 of the glass-metal seal 11, which is seated in a massive pressure resistant metal end cover 12 of the repeater housing. The socket 13 of the plug connection is set into a protective dome comprising an inner member 14 of metal and a ceramic member 17. The sealing rings 15 aid in inhibiting leakage toward the glass-to-metal seal. Members 14 and 17 are held in place respectively by locking rings 14–1 and 17–1. A packing 16 of relatively incompressible but easily deformable material such as rubber fills the void between the sheath 7 of the anchor 6 and the end cover 12 and is subjected to compression for providing an additional pressure barrier.

Figure 2:
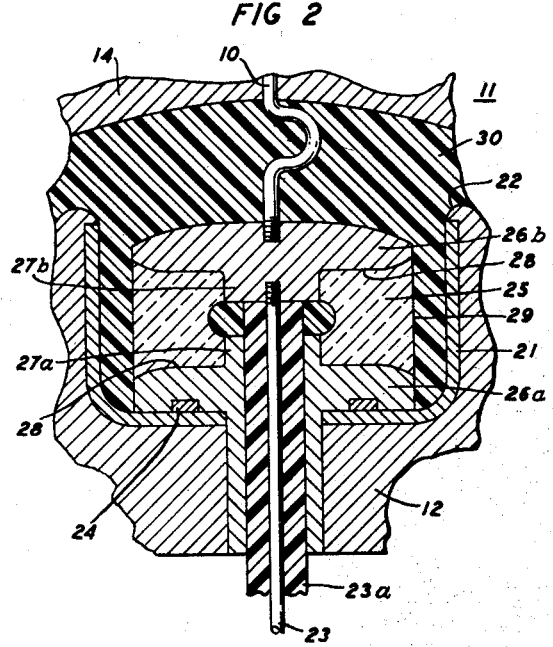
Fig. 2 is an enlarged sectional view of the glass-metal disc seal assembly shown in Fig. 1.

The glass-to-metal seal 11 is located in the end cover 12 in a metal, e.g. copper, cup 21, sealed to the cover at the cup rim 22 by a weld to provide a pressure and vapor barrier. A conductor 23 surrounded by an insulating jacket 23A passes through the bottom of the cup 21 and the bottom disc 26A of the seal and is connected to the top disc 26B. A brazing ring 24 secures the bottom disc 26A to the bottom of the cup 21, as shown in Figs. 1 and 2. The annular space between the jacket 23A and the insulator 25 may be filled with a viscous fluid such as polyisobutylene.

Figure 3:
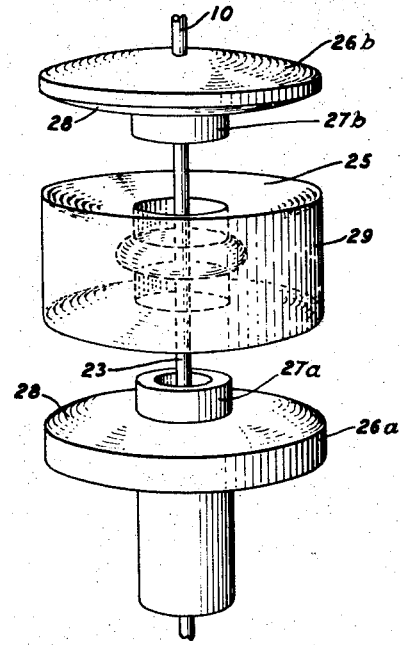
Fig. 3 is an exploded view of a portion of the seal of Figs. 1 and 2.

The seal, shown enlarged in Figs. 2 and 3, consists of a toroidal glass member 25 located between and bonded to two convex metallic discs 26A and 26B. The discs 26A and 26B are of a metallic material bondable to glass or to a ceramic and compatible thereto in thermal expansion characteristics. One such material is an alloy called Kovar and comprising essentially 29 percent nickel, 17 percent cobalt and the remainder iron. The discs 26A and 26B include respectively central bosses 27A and 27B embedded in and bonded to the toroidal glass member 25. The central bosses 27A and 27B provide radial reaction to the external forces acting radially on the outer cylindrical surface 29 of the glass member. Similarly, the external pressures bearing on the face of the top disc 26B are transmitted into the glass body 25 and are counterbalanced by the reaction set up at the inner surface of the bottom disc 26A. The curved portions of the glass-metal interfaces serve to mitigate shear stresses in the glass in these zones and, at the same time, enhance contact pressures to retard leakage. Since the glass is subjected to compression in substantially all directions at its boundaries, the strains in the glass approximate hydrostatic compression. A viscous fluid 30, such as polyisobutylene (not shown in Fig. 1), surrounds the glass-metal seal 11 and serves to transmit the sea pressure thereto, at the same time preventing water from reaching the inner seal.

Figure 4:
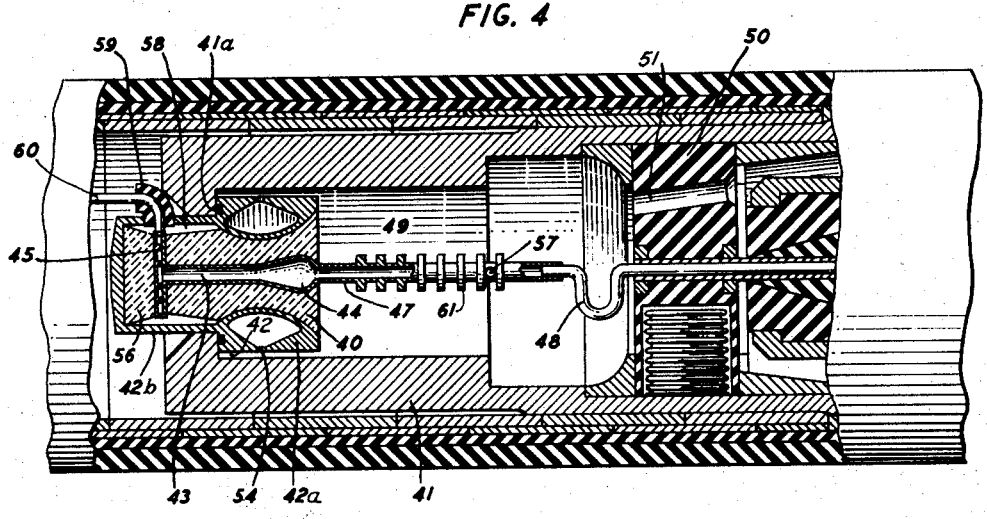
Fig. 4 is a view partially in section of a connection between a cable and a flexible submarine repeater, including an hour-glass seal.
Figure 5:
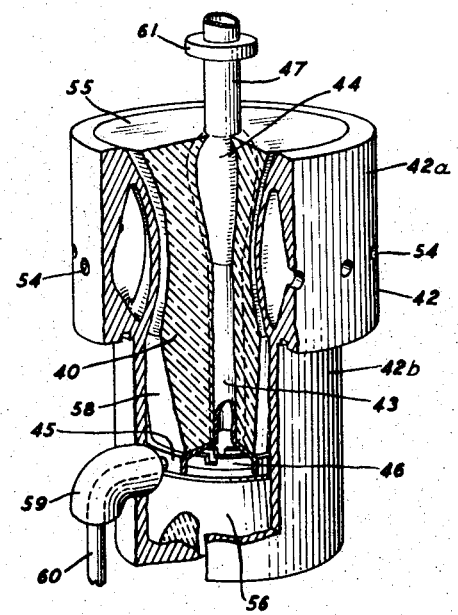
Fig. 5 is an enlarged view partially in section of the hour-glass seal shown in Fig. 4.

The modification of the seal shown in Figs. 4 and 5, which has been designated as an hour-glass seal, is characterized by pressure equalizing glands having curved deformable metal sides, and which may be filled with viscous material, such as polyisobutylene (not illustrated), said glands being bonded to the glass of the seal.

This modification comprises a glass body 40 surrounded by and bonded to a generally cylindrical outer conductor member 42 and enclosing and bonded to a hollow central conductor 43. The member 42 comprises a gland portion 42A and a tail or cup portion 42B. As shown in Fig. 4, this seal is bonded to a metallic body portion 41 of the repeater housing as by a brazing ring 41A.

The glass body 40 has essentially the shape of a hyperboloid of revolution with a tapered end at the low pressure side. The deformable metal gland 42A having a thin longitudinally, convexly curved inner wall is bonded to a corresponding concave surface of the glass body. The hollow central conductor 43 has a bulbous expansion 44 adjacent its high pressure end. A hollow metal pedestal 45 integral with the conductor 43 is located at the inner or low pressure end of the seal.

Thin metallic spacers 46 within the pedestal 45 provide temporary support and avoid collapse of the pedestal during assembly of the seal. A glass or ceramic base or washer 56 provides an insulating support for the conductor pedestal against the tail or cup portion 42B of the outer conductor member 42. The space 58 between the portion 42B of the member 42 and the conical end of the glass body 40 is filled with viscous insulating fluid, e.g., polyisobutylene (not illustrated). The viscous fluid is contained in this space by the insulating bushing 59 for the lead 60 where it leaves the tail structure 42B. As shown in Fig. 4, a hollow extension 47 of the central conductor 43 serves as a connection to a lead 48 and communicates external pressure to the interior of the conductor 43 through a vent hole 57. The space 49 between the seal, the housing member 41 and the insulator 50 is filled with a viscous fluid of the type previously noted via an opening 51 in the insulator 50. This viscous filler communicates with the interior of the gland 42A through vent holes 54 and acts as a transmitter of sea bottom pressure to the seal. This filler, also in cooperation with the seepage retarders 61 on the central conductor 47, inhibits water seepage toward the glass-to-metal seal.

The gland 42A transmits radial pressure through its thin inner wall to the mating outer surface of the glass body 40. The external pressure on the top face 55 of the seal 40 is perpendicular to its plane and the counterbalancing forces are those which are furnished by the hollow pedestal 45 of the central conductor 43. Additional radial outward pressures are applied to the glass through the walls of the central conductor 43.

Figure 6:
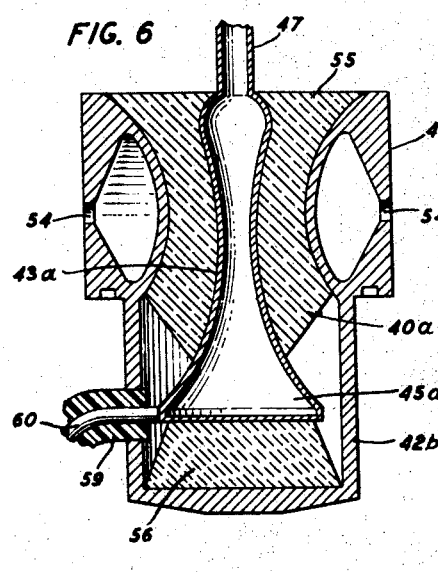
Fig. 6 is a sectional view of a variant of the hour-glass seal illustrative of another embodiment of this invention.

Fig. 6 illustrates a variant of the hour-glass seal illustrated in Fig. 5. The structure here is similar to that of the previously described seal except for the configuration of the inner conductor 43A and the necessary mating configuration of the glass body 40A. In this modification, the stem portion gradually flares into the pedestal portion 45A in contrast to the more abrupt transition to the pedestal in the device of Figs. 4 and 5. The pattern of forces and counterforces is essentially the same in both modifications.

Although the disc seal of this invention has been disclosed in connection with a rigid repeater and the hour-glass seal with a flexible repeater, either seal may be used with either type of repeater by making suitable variations in superficial details without departing from the essential features of the invention.

What is claimed is:

1. A coaxial lead-in vapor seal for withstanding high pressures comprising a centrally apertured, cylindrical, vitreous body having concave ends, metallic discs having convex faces bonded to said ends and including bosses extending into and bonded to the centrally apertured portion of the body, one of said discs comprising a portion of an inner coaxial conductor and having conductive members extending from opposite faces thereof, the other of said discs including a central aperture for one of said conductive members, and insulating means between said other of said discs and said one conductive member.

2. A coaxial lead-in vapor seal for withstanding deep sea pressures and separating two regions having a pressure differential, the seal having at least one surface on which a higher pressure is incident, said seal comprising a vitreous body generated by revolving a plane figure through a complete revolution about an axis outside of said plane figure, said plane figure having opposite edges curving concavely toward each other, said vitreous body being disposed so that the first and second surfaces generated by said concavely curving edges taper inward toward each other adjacent a surface on which the higher pressure is incident, an inner conductive means secured to the first of the concavely curving surfaces and conforming thereto, and an outer conductive means electrically insulated from said inner conductive means secured to the second of said concavely curving surfaces and conforming thereto, whereby the curving interfaces between said vitreous body and said inner and outer conductive means mitigate shear stresses within the vitreous body and improve the seal between said inner and outer conductive means and said body.

3. A coaxial lead-in vapor seal as in claim 2 in which the vitreous body comprises a centrally apertured generally cylindrical member and the first and second concavely curving surfaces are the inner and outer lateral surfaces thereof.

4. A coaxial lead-in vapor seal as in claim 2 in which the vitreous body comprises a centrally apertured generally cylindrical member and the first and second concavely curving surfaces are the end surfaces thereof.

5. A coaxial lead-in vapor seal as in claim 2 in which said inner conductive means has a hollow space therein that is vented to allow an external pressure transmitting medium to enter and apply pressure to a thin walled surface thereof conforming to the first of said concavely curving surfaces of said vitreous body.

6. A coaxial lead-in vapor seal as in claim 2 in which said outer conductive means has a hollow space therein that is vented to allow an external pressure transmitting medium to enter and apply pressure to a thin walled surface thereof conforming to the second of said concavely curving surfaces of said vitreous body.

7. A coaxial lead-in vapor seal as in claim 2 in which the vitreous body comprises a centrally apertured generally cylindrical member, the first and second concavely curving surfaces are the end surfaces thereof, and the inner and outer conductive means include convexly curved metallic disks bonded to said end surfaces.

8. A coaxial lead-in vapor seal as in claim 2 in which the vitreous body comprises a generally cylindrical member having a central aperture therein, the first and second concavely curved surfaces are the inner and outer lateral surfaces thereof, the inner conductive means comprises a hollow columnar member extending within said aperture and bonded to said inner surface, and the outer conductor means comprises a hollow toroidal member surrounding said vitreous body and bonded to said outer surface.

9. The coaxial lead-in vapor seal as in claim 2 in which the vitreous body comprises a generally cylindrical member having a central aperture therein, the first and second concavely curved surfaces are the inner and outer lateral surfaces thereof, the inner conductive means comprises a columnar member having a pedestal at one end thereof, said columnar member extending within said aperture and bonded to said inner surface, the outer conductive means comprises a cup-shaped member the upstanding portion of which surrounds and is bonded to said outer surface and the base portion of which is positioned a spaced distance from said pedestal, and a dielectric member is positioned between said pedestal and said base portion.

References Cited in the file of this patent

UNITED STATES PATENTS

| | | |
|---|---|---|
| 1,998,549 | Lapp et al. | Apr. 23, 1935 |
| 2,676,197 | Read et al. | Apr. 20, 1954 |